(No Model.) 3 Sheets—Sheet 1.
J. A. STONE.
CORN HARVESTING MACHINE.

No. 521,680. Patented June 19, 1894.

(No Model.) 3 Sheets—Sheet 2.

J. A. STONE.
CORN HARVESTING MACHINE.

No. 521,680. Patented June 19, 1894.

Witnesses:
E. G. Osmun
Chas. L. Goss.

Inventor:
John A. Stone,
By ____
Attorney.

(No Model.)  3 Sheets—Sheet 3.

J. A. STONE.
CORN HARVESTING MACHINE.

No. 521,680. Patented June 19, 1894.

United States Patent Office.

JOHN A. STONE, OF VAIL, IOWA.

CORN-HARVESTING MACHINE.

SPECIFICATION forming part of Letters Patent No. 521,680, dated June 19, 1894.

Application filed June 21, 1887. Serial No. 241,953. (No model.)

*To all whom it may concern:*

Be it known that I, JOHN A. STONE, of Vail, in the county of Crawford and State of Iowa, have invented certain new and useful Improvements in Corn-Harvesting Machines; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main objects of my invention are to sever the stalks from the ground, to present the stalks butts first to the snapping rollers, to pass them obliquely between said rollers and thus separate the stalks and ears and prevent their clogging said rollers and to husk and clean the ears.

It consists essentially in setting the snapping rollers obliquely to the line of travel of the machine or to the conveyer by which the stalks are fed thereto, of a conveyer arranged to conduct the stalks to said rollers with the butts in advance of the tops, of a trough set under the receiving sides of the snapping rollers and arranged to catch the ears falling therefrom, of cleaning rollers arranged to strip the husks and silk from the ears as they pass through said trough, of a cutter arranged to sever the stalks from the ground and of other features hereinafter specifically set forth.

In the accompanying drawings like letters designate the same parts in all the figures.

Figure 1:
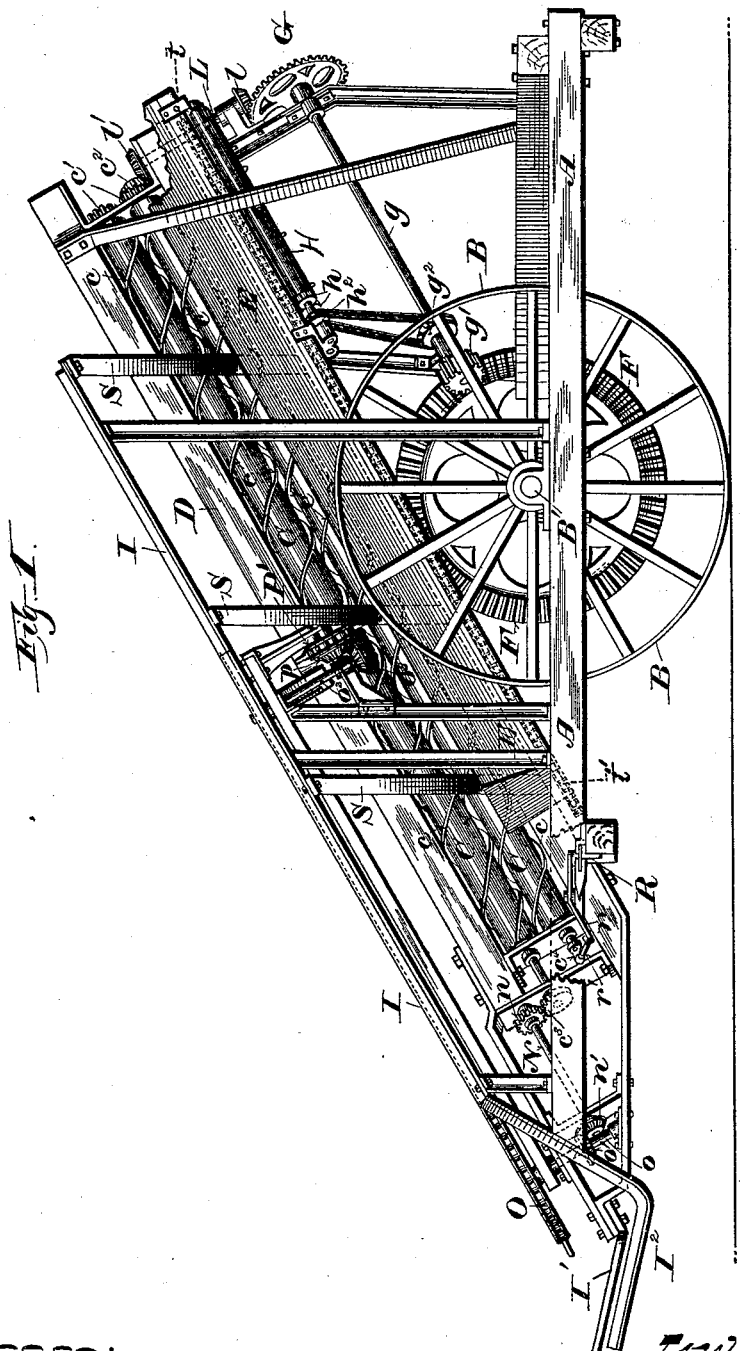
Figure 2:
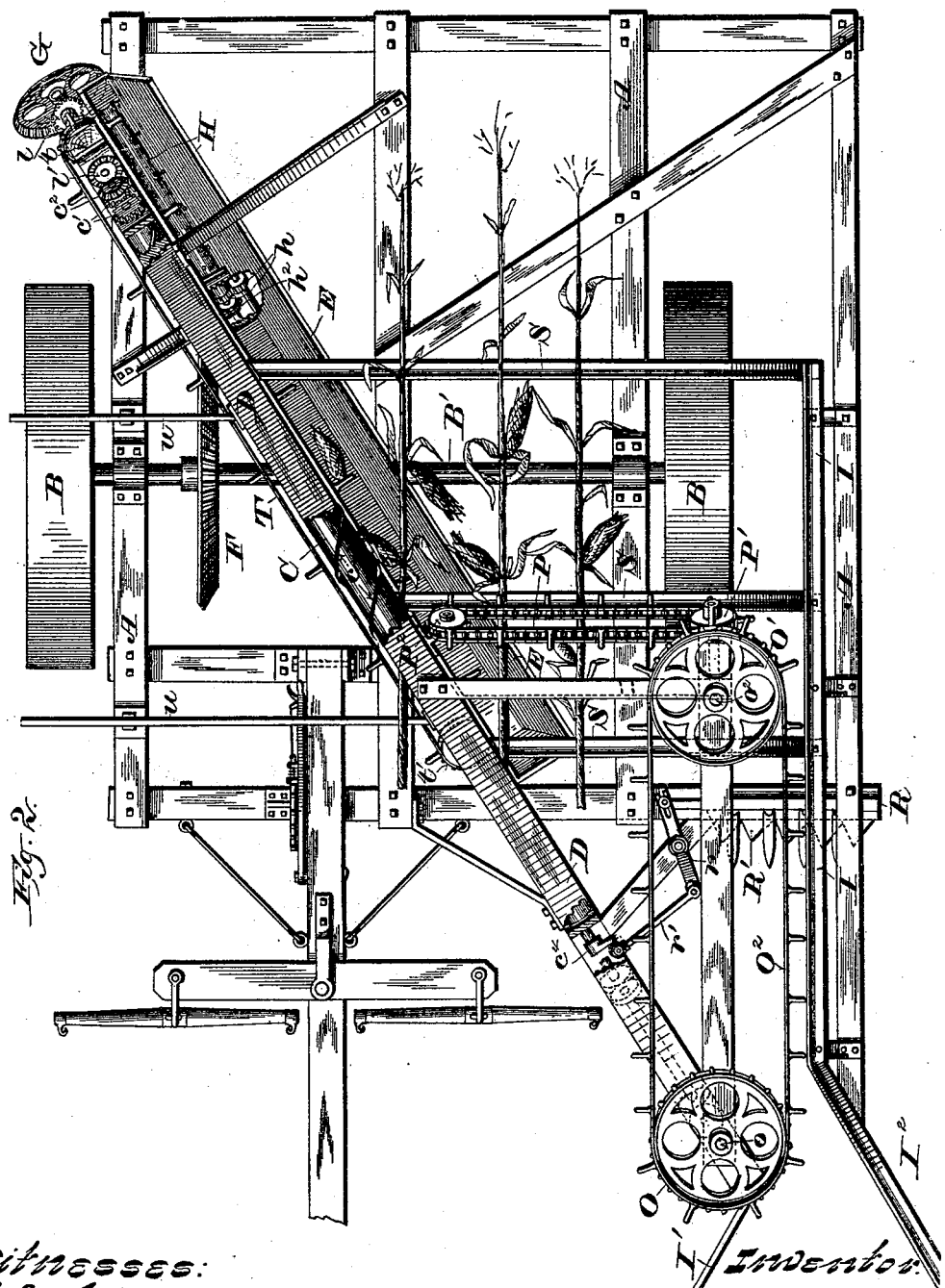
Figure 3:
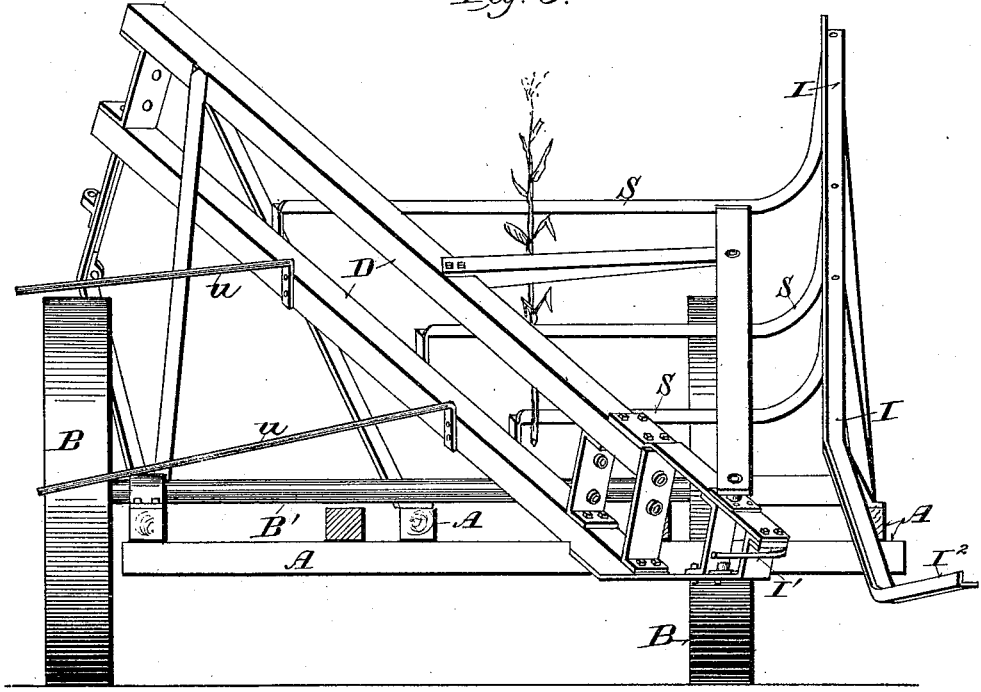

Figure 1 is a side elevation of my improved machine. Fig. 2 is a plan view of the same, and Fig. 3 is a front elevation of the framework, guide rests and supporting gearing of the machine.

A A represent the main frame of the machine.

B B are the supporting and driving wheels fixed upon axle B', which turns therewith in boxes formed in or attached to said frame A. Upon the axle B' is fixed the driving gear F.

C C are the two cylindrical rollers each formed or provided with a spiral rib $c$ and supported parallel with, and one above the other in, a frame D D which is attached at its front end to the main frame A and rises therefrom obliquely toward the rear of the machine where it is securely supported by braces rising from said main frame A.

$g$ is an oblique shaft set parallel with and underneath the snapping rollers C C, and provided at its front end with a pinion $g'$ working with the main driving gear F, a little to the rear thereof with a sprocket wheel $g^2$ and at the rear end with a bevel gear G.

L is an inclined shaft supported in suitable bearings provided therefor at the rear end of the roller frame D transversely to shaft $g$ and rollers C and provided at the lower end with a bevel pinion $l$ working with the gear G, at an intermediate point with a sprocket wheel $t$ and at its upper end with a bevel gear $l'$ working with a similar gear $c^2$ attached to the adjacent end of the lower roller shaft. Upon the same ends of the roller shafts are mounted the interworking twin gears $c'$ $c'$ by which the upper roller C is driven by and simultaneously with the lower roller C.

R is the finger bar and R' a reciprocating cutter working therein and connected at its inner end with one end of a lever $r$ which is fulcrumed to the frame of the machine and connected at the opposite end by a rod $r'$ with a crank $c^4$ on the front end of the lower roller shaft.

I is an upwardly inclined guide set parallel with the travel of the machine transversely to and over the finger bar R and bent outwardly at its lower front end to form a gathering point or arm $I^2$. $I'$ is the other gathering point or arm bent in the opposite direction.

S S are guide rests attached to the guide I, from which they extend downwardly and are then bent inwardly, extending horizontally toward and to the opening between the snapping rollers C C.

$O^2$ is a chain belt provided at intervals with outwardly projecting fingers and mounted upon sprocket wheels O O' with its ascending section a short distance from, and parallel with the guide I. The shaft $o$ of the lower front sprocket wheel O is provided with a bevel gear $o'$ working with a similar gear $n'$ on the shaft N, which is provided at its opposite end with a spur gear $n$ working with a like gear $c^3$ on the lower end of the upper roller shaft from which the sprocket wheels O O' and chain $O^2$ are thus driven.

P is a chain belt mounted upon sprocket wheels P' P² transversely to the chain O and working from the upper end thereof toward the snapping rollers C parallel with and near one of the guide-rests S. Like chain O it is provided at intervals with outwardly projecting fingers. Upon the shaft $o^2$ of the upper sprocket wheel O' is fixed the bevel gear $o^3$ which works and drives a similar gear $p$ on the shaft of the adjacent sprocket wheel P'.

E is a box or trough set under the receiving sides of the snapping rollers C C parallel therewith and arranged to catch the ears as they are severed by said rollers from the stalks.

T is a chain belt mounted upon sprocket wheels $t\ t'$ at or near the ends of the rollers C and provided, like chains $O^2$ and P, with spurs or fingers, those on the ascending section of said chain belt working through a slot in trough E parallel with and close to the bottom thereof, as shown in Fig. 2.

Close under the upper end of the trough E are supported side by side parallel therewith the cleaning rollers H H, one or both of which is provided with teeth or spurs working with indentations in the other and adjacent to which the bottom of said trough E is removed. The upper exposed sides of said rollers are caused to rotate simultaneously toward each other by the interworking twin gears $h\ h$ mounted upon their shafts and they are driven by a chain belt connecting a sprocket wheel $h^2$ on one of said roller shafts with the sprocket wheel $g^2$ on the shaft $g$ previously described.

$u\ u$ are guides extending laterally from the snapping rollers C and arranged to conduct the stalks therefrom and discharge the same at the side of the machine. In place of the single chain conveyer P two or more may be provided and all driven by sprocket wheels on the extended shaft of sprocket wheel P'.

My improved corn harvester operates as follows:—The machine being so guided as to receive a row of corn between the gathering points or arms I' I², the stalks are guided to the chain $O^2$, the fingers on which engage and convey them to the cutter R', by which they are severed from the ground. They are then delivered by the chain $O^2$ upon the guide rests S S, which support them in an inclined position corresponding vertically to the inclination of the rollers C, and moved laterally upon said rests by the chain P to said rollers C, which being set oblique thereto engage the butt ends of said stalks first and draw the same obliquely between them thus presenting the ears singly and butts first to said rollers by which and the spiral ribs $c\ c$ thereon the stems are snapped and they are severed from the stalks. The rollers C C may be so set with reference to each other as to cause the ribs $c\ c$ to run close together and thus operate like shears to cut the stems of the ears when they are tough or green. The ears dropping when severed from the stalks into the trough E are engaged by the fingers of chain T and carried over the cleaning rollers H H the spurs of which strip the remaining husks and silks therefrom, and are then discharged by said chain at the upper end of said trough into any suitable receptacle provided for the purpose. The chain P engaging the stalks as they are cut and delivered upon the rests S and moving the same laterally prevent the entanglement of the tops and ears and the bunching or massing of the stalks and the consequent choking or clogging of said rollers.

I claim—

1. The combination in a corn harvesting machine of a pair of snapping rollers, set obliquely to the line of travel of the machine, a stalk cutter and a conveyer arranged to conduct the stalks transversely to the line of travel of the machine and present the same obliquely to said rollers, substantially as and for the purposes set forth.

2. The combination in a corn harvesting machine of a stalk cutter, a rest or support located behind said cutter transversely to the line of travel of the machine and arranged to receive and support the stalks in a vertically inclined position with the tops uppermost and to the rear, a pair of snapping rollers placed one above the other and vertically inclined upward and rearward so as to receive the stalks from said rest or support between them, and conveying mechanism arranged to conduct the stalks delivered upon said rest or support laterally and deliver the same obliquely and butts first to said snapping rollers, substantially as and for the purposes set forth.

3. The combination in a corn harvesting machine of a stalk cutter, a belt provided with projections arranged to conduct the stalks to said cutter and deposit the same upon a transverse support or guide, snapping rollers set obliquely to said support or guide, and a conveyer arranged to move the stalks laterally upon said support or guide and to deliver the same obliquely to said rollers, substantially as and for the purposes set forth.

4. The combination in a corn harvesting machine of a stalk cutter, snapping rollers, and a conveyer working obliquely to said rollers and arranged to receive the stalks as they are cut and conduct the same separately and laterally to said rollers, which receive them butts first substantially as and for the purposes set forth.

5. The combination in a corn harvesting machine of a stalk cutter a pair of snapping rollers, one set above the other, obliquely to the line of travel of the machine a conveyer arranged to feed the stalks laterally and butts first thereto, a trough set underneath the receiving sides of said rollers, and arranged to catch the ears as they drop therefrom, and a conveyer working in, and lengthwise of, said trough, substantially as and for the purposes set forth.

6. The combination in a corn harvesting machine of a stalk cutter a pair of snapping rollers set one above the other obliquely to the line of travel of the machine, conveying mechanism arranged to feed the stalks separately, obliquely and butts first to said rollers, a conduit arranged to catch the ears as they are severed from the stalks by said snapping rollers, husk stripping rollers and a conveyer traversing said conduit and arranged to move the ears over said husk stripping rollers, substantially as and for the purposes set forth.

7. The combination in a corn harvesting machine of a pair of snapping rollers set one above the other obliquely to the travel of the machine and vertically inclined, a stalk cutter, a guide set parallel with the travel of the machine over said cutter, a transverse rest or support extending therefrom obliquely to said rollers, an elevating belt working parallel with said guide and arranged to conduct the stalks to said cutter and deliver the same upon said rest or support and a conveyer working parallel with said rest or support and arranged to conduct the stalks laterally and singly to said rollers to which they are fed butts first, substantially as and for the purposes set forth.

In testimony that I claim the foregoing as my own I affix my signature in presence of two witnesses.

JOHN A. STONE.

Witnesses:
CHAS. L. GOSS,
GEORGE M. GOLL.